Sept. 13, 1932.                G. E. DEAN                    1,876,866
                              STREET SWEEPER
                     Filed Dec. 22, 1930      2 Sheets-Sheet 1
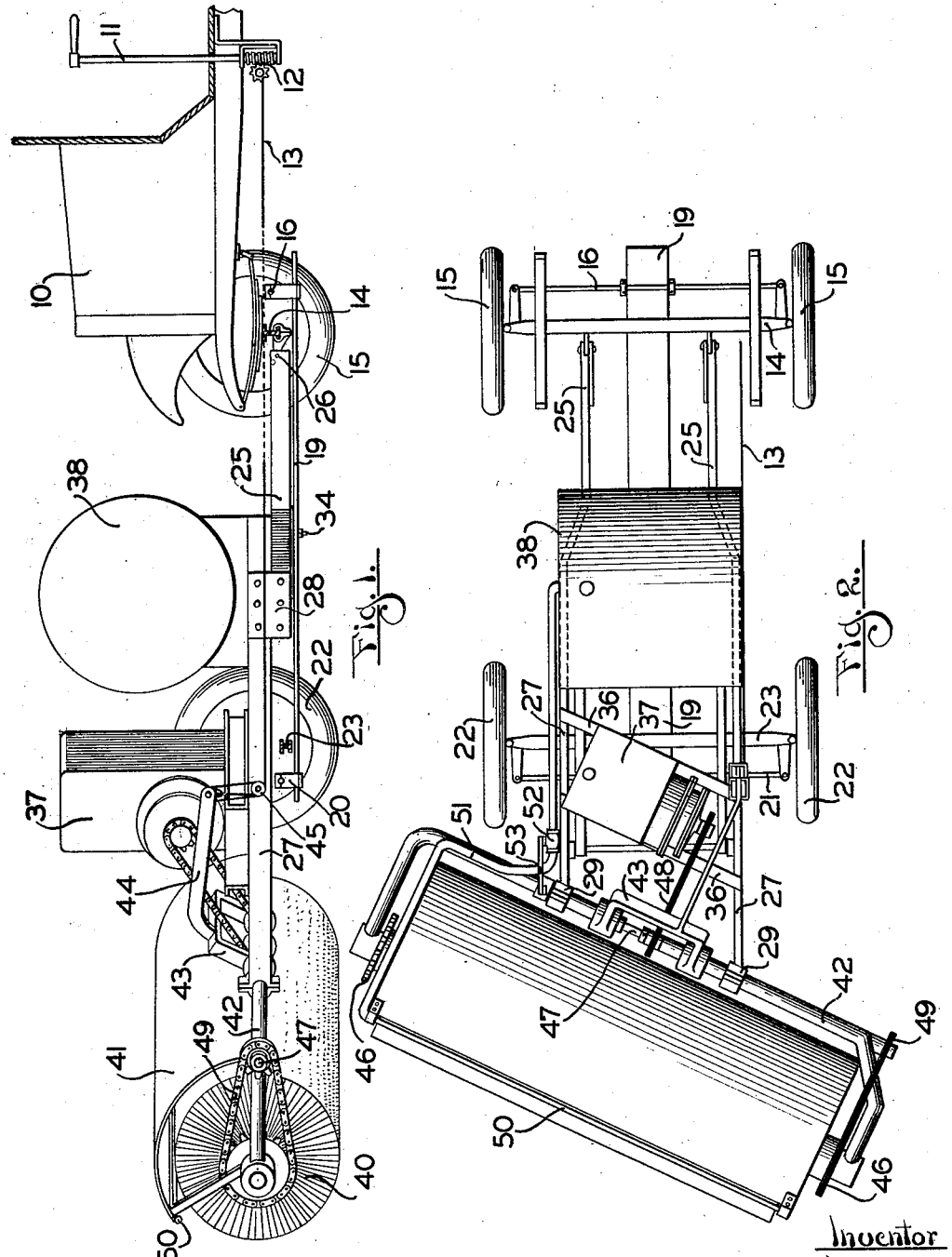
Inventor
George E. Dean
By Liverance and
Van Antwerp
Attorneys Sept. 13, 1932.   G. E. DEAN   1,876,866
STREET SWEEPER
Filed Dec. 22, 1930   2 Sheets-Sheet 2

Inventor
George E. Dean
By Liverance and VanAntwerp
Attorneys

Patented Sept. 13, 1932

1,876,866

UNITED STATES PATENT OFFICE

GEORGE E. DEAN, OF GRAND RAPIDS, MICHIGAN, ASSIGNOR TO CHARLES G. WILLETT, OF GRAND RAPIDS, MICHIGAN

STREET SWEEPER

Application filed December 22, 1930. Serial No. 503,960.

This invention relates to a street cleaning apparatus and more definitely to a two wheeled truck having a revolving brush mounted at its front end and being adapted for pivotal connection at its rear end to the front axle of an automobile.

Previous to my invention it has been the practice to mount units of this character upon a truck or else upon a trailer to the truck. There are several objections to both of these constructions. If the sweeping device is mounted upon the truck itself it is necessary that the truck be especially designed to receive the same and obviously the expense of so doing is considerable and in many instances is prohibitive with reference to the purchase of machines of this character by small towns and municipalities. If a street sweeping device is mouted upon a trailer it has an obvious disadvantage of being out of sight of the driver of the truck.

I overcome both of the aforesaid difficulties by making my sweeper unit separate from the automotive vehicle and by mounting it at the front of the vehicle. By so doing I am able to construct a relatively simple truck which is pushed in front of the usual truck, hereinafter called an automotive vehicle in order to distinguish it from my auxiliary truck which is relatively inexpensive to manufacture and which is so constructed as to be capable of being properly controlled by the driver of the truck and furthermore its operation is always visible from the seat of the automotive vehicle.

One advantage of my device lies in the construction whereby only a single set of wheels are required to mount the sweeping unit the revolving brush of the unit being mounted on one side of the axis of the wheels and the storage tank for water being mounted on the opposite side of the axis of the wheels thus tending to counterbalance each other.

Another feature of my invention, and I deem this to be the most important advantage, lies in my novel mechanism whereby the wheels of the truck are steered by the steering mechanism of the automotive vehicle. Also, this means is capable of adjustment whereby the degree of turning of the wheels on the truck may be rendered greater than the degree of turning of the wheels of the automotive vehicle. Thus, the sweeping device may be made to properly navigate around street corners snugly adjacent the curb line to properly sweep the intersections and thus permitting the automotive vehicle to remain in the street at all times. In other words, it is not necessary that the automotive vehicle be driven adjacent the curb when the sweeper is being operated around a corner but the vehicle may be driven at a short distance from the curb which, obviously, is desirable.

Another advantage of my invention lies in my automatic valve arrangement whereby raising and lowering of the street sweeping roller will cause the water supply thereto to be regulated.

Still another advantage lies in my control means whereby the street sweeper may be raised and lowered from the cab of the pusher or automotive sweeper.

Objects and advantages of the invention will be set forth in part hereinafter, and in part will be obvious herefrom, or may be learned through practice with the invention; the same being attained through the means, instrumentalities and combinations pointed out in the appended claims.

Fig. 1 is a side view of my invention attached to the usual automotive vehicle, parts being broken away in order to expedite the showing.

Fig. 2 is a plan view of Fig. 1.

Fig. 4 is a view similar to Fig. 3 showing the position of the several wheels when the sweeping device is being driven around a corner or the like.

Like numerals refer to like parts in the several views.

Referring particularly to Fig. 1, 10 designates an automotive vehicle having a control means 11 mounted in its cab and accessible to the driver of the vehicle. Operation of this member 11 through the gearing 12 is adapted to tighten or loosen the flexible element 13, the purpose of which will later be set forth.

Figure 6:
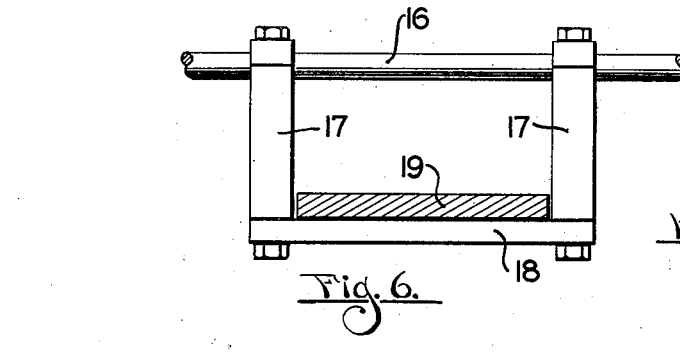
Fig. 6 is an enlarged view showing the connection between the lever and either of the tie rods.

The vehicle 10 has a front axle 14, wheels 15 being pivotally mounted on either end thereof and a tie rod 16 interconnects these wheels in the usual manner. Depending clamps 17 are rigidly connected to the tie rod 16 and a cross piece 18, see Fig. 6, serves as means to slidably support the lever or guiding member 19.

The other end of the lever 19 is received in a guideway 20, similar in construction to the guideway on the rod 16, the guideway 20 being rigidly attached to the tie rod 21. The tie rod 21 interconnects the wheels 22 on the axle 23, in a manner similar to the operation of the tie rod 16 and causes the wheels to move simultaneously.

Figure 3:
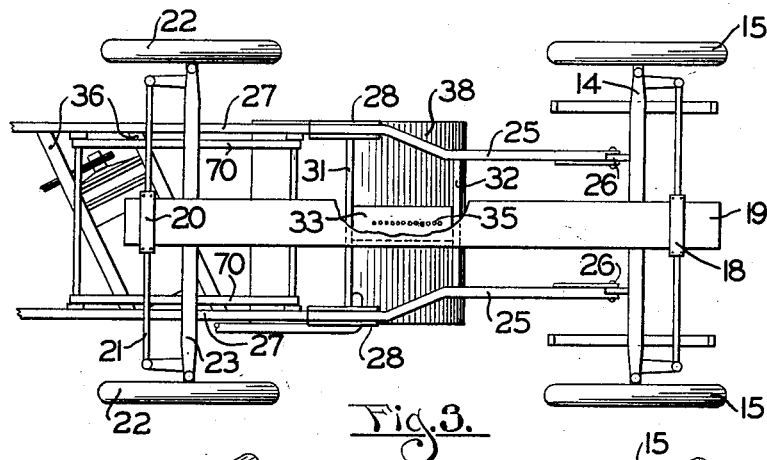
Fig. 3 is a view looking from underneath the sweeping unit when the unit is traveling in a straight line preceding the automotive vehicle.
Figure 4:
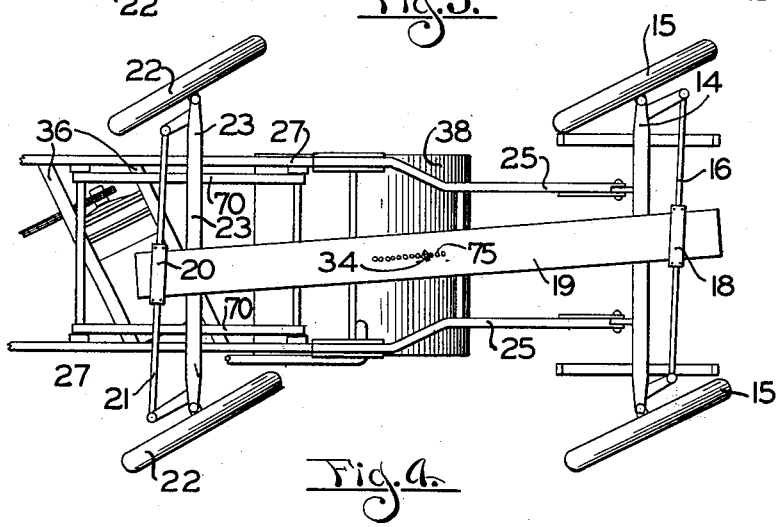
Figure 5:
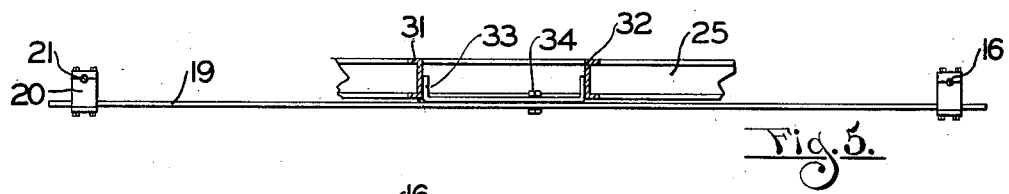
Fig. 5 is a longitudinal view through the steering lever, this steering lever interconnecting the tie rods of the truck and of the automotive vehicle.

Longitudinal frame members 25, see Figs. 2, 3 and 4, are pivotally connected to the axle 14 as at 26, and are rigidly connected to corresponding side members 27 by means of the plates 28, these latter members terminating in bearings 29. See Fig. 2. Cross members 31 and 32, see Fig. 5, maintain the longitudinal frame members in spaced relationship and also serve to support the adjusting piece 33 which is welded thereto. The adjusting piece 33 has a series of holes 35 therein, any one of these holes being adapted to receive the pivot pin 34. The pivot pin passes through any one of a number of holes 75 in the lever 19.

Thus by adjusting this pivot the amounts of the movements of the ends of the lever 19 may be regulated and thus the degree of movement of the set of wheels on the truck controlled with respect to the degree of movement of the set of wheels on the vehicle. For instance, if the corners to be turned are of extremely short radius the wheels on the truck will be adjusted so that they will turn very shortly.

The axle 23 is fixed to the springs 70 which in turn are attached to the members 27 and cross members 36, see Fig. 2, are pivoted above the longitudinal frame members and serve to support the prime mover 37. A storage tank 38 is also mounted upon the frame, this tank being adapted to receive water and being arranged behind the wheels 22 whereby it will tend to counterbalance the roller 40.

The roller 40 is protected by the usual guard 41 and is mounted in bearings upon the yoke 42, this yoke being pivotally mounted in the bearings 29. A bracket member 43, see Figs. 1 and 2, is fixed to the yoke 42 and has a rearwardly extending arm 44. A pulley 45, see Fig. 1, is mounted on the frame member 27 and serves as a guide for the flexible element 13, previously referred to. Thus by proper manipulation of the control lever or member 11 in the cab of the automotive vehicle the element 13 is tightened or loosened and thus the brush 40 is raised or lowered.

The brush 40 has sprockets 46 at either end thereof and hence is reversible. Thus, when the brush fibers become bent or twisted in one direction the entire brush unit may be reversed thus giving in effect a new brush. A shaft 47 is driven by means of the prime mover through the chain 48 and this shaft in turn drives the brush through the chain 49.

A water distributing device 50 is positioned at the front edge of the rollers, see Figs. 1 and 2, and is furnished water through the pipe 51 in which a valve 52 is positioned. A lever 53 extends from this valve and is adapted to be controlled by the rotation of the yoke 42 in the bearings 29 so that the water supply will be shut off when the brush is raised from contact with the ground.

From the above description it will be appreciated that I have invented a relatively simple two wheeled sweeping attachment which can be easily and quickly attached to the front of an ordinary automobile or automotive vehicle, thus enabling the driver of the automobile or vehicle to not only drive the same but also to perform the additional duty of manipulating and operating my street sweeping device. Thus no additional man is required to operate a sweeper. Furthermore, the operation of my sweeper is in no way tied up or connected with the automotive vehicle and hence any type or make of vehicle may be used as a pushing device or actuated for the operation of my street sweeping unit.

Having thus revealed this invention, I claim as new and desire to secure the following combinations and elements or equivalents thereof, by Letters Patent of the United States.

I claim:

1. An automotive vehicle comprising, a front axle, pivoted wheels thereon, a tie rod connecting the wheels so that movement of one wheel about its pivot is transmitted to the other wheel, a guideway rigid with the tie rod, a frame, means to pivot the frame to the front axle, wheels for the frame, means to pivot the wheels on the frame, guiding means for the wheels, a lever pivoted on the frame and having one end received in the aforesaid guideway and means connecting the other end of the lever and the guiding means for the last mentioned wheels whereby movement of the tie rod will cause movement of the guiding means.

2. A combination of elements as recited in claim 1 having an adjustable pivot for the lever.

3. In an automotive vehicle having a front axle and means for steering the vehicle, the combination of a truck, said truck comprising an axle, wheels pivotally mounted on said axle, means for interconnecting the steering means of the vehicle and the wheels of the truck whereby they move in unison and means for pivotally connecting the truck to the front axle of the automotive vehicle.

4. A device of the character described comprising an automotive vehicle having a front axle, wheels pivoted thereon at its ends, a tie rod interconnected between the wheels, a truck frame, an axle rigid with the truck frame, wheels pivotally mounted on the axle, a second tie rod interconnecting the last mentioned wheels, means for fastening the truck frame to the front axle, and means connecting the tie rods whereby movement of one set of wheels causes corresponding movement of the other set of wheels.

5. A device of the character recited in claim 4, in which the last mentioned means is adjustable thus permitting the movement of one set of wheels to be proportionately greater than that of the other set of wheels.

6. A device comprising, the elements in combination of claim 4, but further characterized by the fact that the means connecting the tie rods includes a lever pivoted intermediate its ends, the ends of the lever being connected with the tie rods.

7. An automotive vehicle comprising a front axle, pivoted wheels thereon, means connecting the wheels so that movement of one wheel about its pivot is transmitted to the other wheel, a guideway rigid with the said connecting means, a frame, means to movably connect the frame to the front axle, wheels for the frame, means to pivot the wheels on the frame, guiding means for the wheels, a lever pivoted on the frame and having one end received in the aforesaid guideway and means connecting the other end of the lever and the guiding means for the last mentioned wheels whereby movement of the connecting means will cause movement of the guiding means.

8. In an automotive vehicle having a front axle and means for steering the vehicle the combination of a truck, said truck comprising an axle, wheels pivotally mounted on said axle, means for interconnecting the steering means of the vehicle and the wheels of the truck whereby they move in the same direction and means for pivotally connecting the truck to the front axle of the automotive vehicle.

9. A device of the character described comprising an automotive vehicle having a front axle, wheels pivoted thereon at its ends, a tie rod interconnected between the wheels, a truck frame, an axle rigid with the truck frame, wheels pivotally mounted on the axle, a second tie rod interconnecting the last mentioned wheels, means for fastening the truck frame to the front axle, and means connecting the tie rods whereby movement of one set of wheels causes corresponding movement of the other set of wheels in the same direction.

In testimony whereof I affix my signature.

GEORGE E. DEAN.